United States Patent [19]

Cartasegna

[11] Patent Number: 4,883,840
[45] Date of Patent: Nov. 28, 1989

[54] ELASTOMER MODIFIED POLYCARBONATE COMPOSITIONS OF IMPROVED IMPACT STRENGTH

[75] Inventor: Silvestro Cartasegna, Brussels, Belgium

[73] Assignee: Exxon Chemical Patents Inc., Linden, N.J.

[21] Appl. No.: 133,945

[22] Filed: Dec. 17, 1987

[30] Foreign Application Priority Data

Dec. 23, 1986 [GB] United Kingdom ................. 8630819

[51] Int. Cl.⁴ ............................................. C08L 69/00
[52] U.S. Cl. ....................................... 525/146; 525/67; 525/439
[58] Field of Search .................. 525/146, 468, 67, 439

[56] References Cited

U.S. PATENT DOCUMENTS

| | | | |
|---|---|---|---|
| 4,123,436 | 10/1978 | Holub et al. | 260/30.8 R |
| 4,172,859 | 10/1979 | Epstein | 428/402 |
| 4,358,563 | 11/1982 | Quinn et al. | 525/146 |
| 4,444,950 | 4/1984 | Sakano et al. | 525/67 |
| 4,559,388 | 12/1985 | Liu et al. | 525/146 |
| 4,628,074 | 12/1986 | Boutni | 525/146 |

FOREIGN PATENT DOCUMENTS

| | | |
|---|---|---|
| 0106096 | 4/1984 | European Pat. Off. |
| 0119531 | 9/1984 | European Pat. Off. |
| 0119533 | 9/1984 | European Pat. Off. |
| 2118193 | 10/1983 | United Kingdom |

OTHER PUBLICATIONS

Product Bulletin "Vistalon", 86 ET B160/May '87, Exxon Chemicals.

Primary Examiner—Theodore E. Pertilla
Attorney, Agent, or Firm—W. G. Muller

[57] ABSTRACT

Polycarbonate and blends of polycarbonate with polyalkylene terephthalate are improved in impact properties by incorporation of a modifier comprising an EPM and/or EPDM elastomer in combination with an ethylene homo- or copolymer plastics component such as HDPE.

16 Claims, 2 Drawing Sheets

ELASTOMER MODIFIED POLYCARBONATE COMPOSITIONS OF IMPROVED IMPACT STRENGTH

This invention relates to polycarbonate compositions which have been modified to improve impact strength.

Polycarbonate is a widely used engineering plastics material, and generally carbonate polymers may be typified as possessing recurring structural units of the formula:

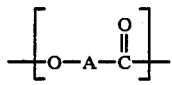

where A is a divalent aromatic radical. Polycarbonates which are widely used in engineering plastics applications have the typical general formula:

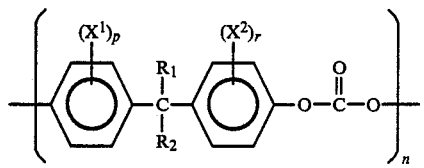

where $R^1$ and $R^2$ are, independently, hydrogen, alkyl or phenyl; $X^1$ and $X^2$ are independently hydrogen, halogen (eg chlorine or bromine), alkyl, alkenyl or alkaryl (optionally substituted); p and r represent the total number of substituents (other than hydrogen) on the rigns and are, independently, integers from from 0 to 4; and n represents the total number of monomer units in the polymer and typically is an integer of at least 30. The alkyl and alkenyl groups preferably have from 1 to 10, more frequently 1 to 6, carbon atoms, inclusive. Aryl is preferably phenyl.

Polycarbonate homopolymers and copolymers commonly used in engineering plastics applications and which may be used in exercise of the present invention typically have a molecular weight (number average) of from 8,000 to 200,000 or even higher, but preferably from 10,000 to 80,000, and an intrinsic viscosity of from about 0.3 to 1.0 deciliters per gram as measured in methylene chloride at 25° C.

The following is a Description of Drawings.

FIG. 1 shows notched-Izod values compared to flexural modulus values.

FIG. 2 shows notched-Izod as a function of temperature. The symbol 1 represents an embodiment of the instant invention.

Figure 1:
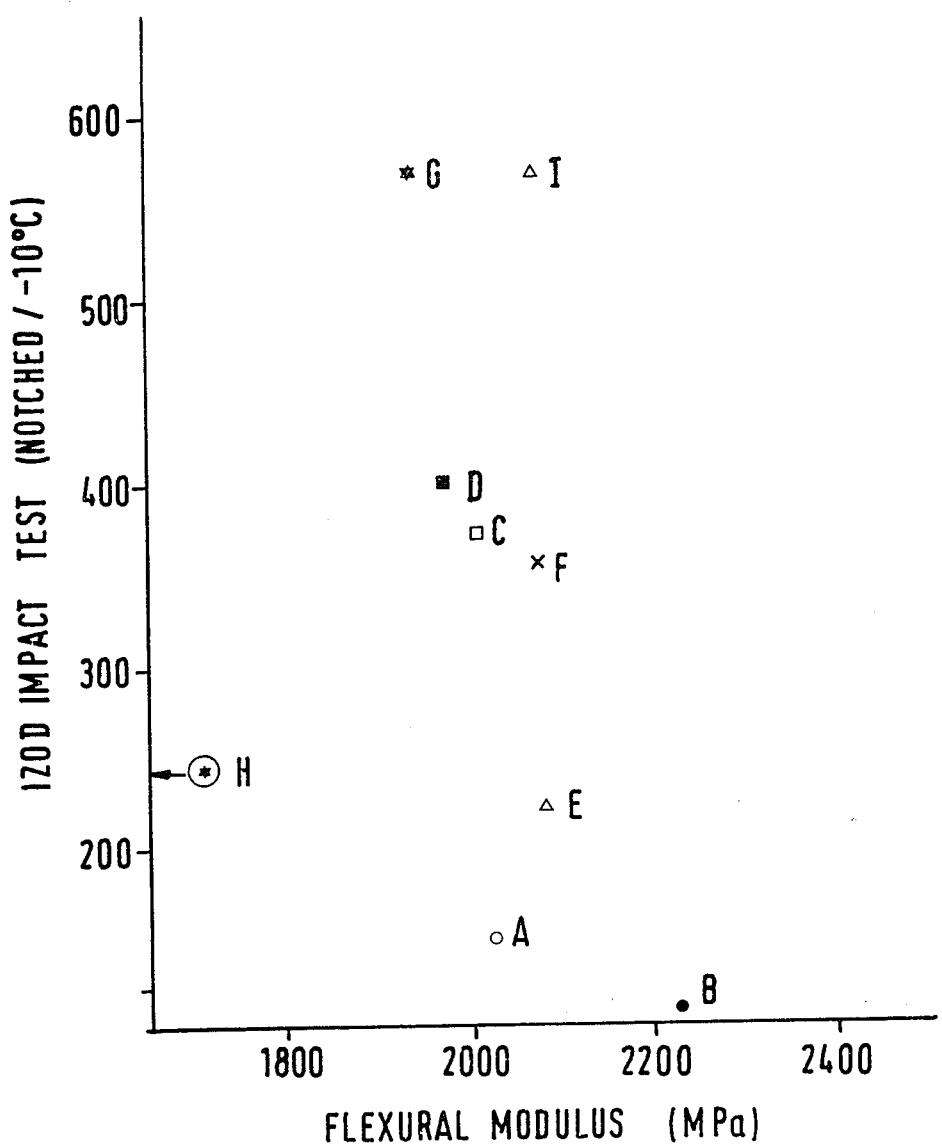
FIGS. 1 and 2 represent graphically the improved flow and impact properties reported in Table 2.

The polycarbonate resins are, for example, prepared from dihydric phenols, including 2,2-bis(4-hydroxyphenyl) propane (also termed bisphenol A), bis-(4-hydroxyphenyl)methane, 2,2-bis(4-hydroxy-3-methylphenyl)-propane, 4,4-bis(4-hydroxyphenyl)heptane, 2,2-(3,5,3',-5'-tetrachloro-4,4'-dihydroxypropane, 2,2-(3,5,3',5'-tetrabromo-4-hydroxy-diphenyl)propane, and (3,3'-dichloro-4,4'dihydroxy-diphenyl)methane. Still other dihydric phenols which are also suitable for producing polycarbonates are disclosed in U.S. Pat. Nos. 2,999,835; 3,028,365; 3,334,154 and 4,131,575.

The aromatic polycarbonates can be prepared using known processes, such as, for example, by reacting a dihydric phenol with a carbonate precursor, e.g., phosgene, in accordance with the techniques set forth in the above cited patents and in U.S. Pat. Nos. 4,018,750 and 4,123,436, or by transesterification processes such as those disclosed in U.S. Pat. No. 3,153,008.

Also intended to be included within the term polycarbonate as used herein are aromatic polyestercarbonates derived from a mixture of a dihydric phenol, a dicarboxylic acid or acid chloride and phosgene, for example, as disclosed in U.S. Pat. No. 3,169,121 and incorporated by reference as well as branched polycarbonates such as disclosed in U.S. Pat. No. 4,001,184 and incorporated by reference. The term polycarbonate as used herein is also intended to include blends of two or more aromatic polycarbonates, including any of those which have been described. Because of its polymeric structure polycarbonate is among the tougher thermoplastic materials useful for moulded and extruded parts, as demonstrated by its high elongation and high energy to break characteristics, manifested in standard tensile and impact tests. Unfortunately polycarbonate has the drawback that it is somewhat sensitive to cracks or notches in its surface, and to sample thickness. This results in brittle behaviour that greatly limits its usefulness, being subject to brittle failures of moulded or extruded parts. Furthermore, its low shear sensitivity makes polycarbonate difficult to process, especially when being moulded into thin or complicated artefacts.

An additional difficulty associated with industrial use of parts formed from polycarbonate is that the polymer, being amorphous, has a rather poor Environmental Stress Cracking Resistance (ESCR), that is, mechanical properties and toughness are drastically reduced when the polymer is put in contact with common industrial solvents, such as gasoline.

It is known to improve the ESCR of polycarbonate polymers by incorporation of semicrystalline polymers such as polybutene terephthalate (PBT) or polyethylene terephthalate (PET). However, these materials also have the effect of significantly reducing the impact performance of the polycarbonate. The ductile/brittle transition temperature is considerably increased, and also the energy to break is significantly lowered.

In order to alleviate the negative effects of PBT/PET addition it is also known to incorporate an elastomeric third component to improve impact properties, for example acrylic rubbers or acrylonitrile butadiene styrene copolymers (ABS).

In this regard, reference is made to two publications which teach the use of ethylene copolymer and terpolymer rubbers in combination with polycarbonate plastics. Thus U.S. Pat. No. 4,444,950 (Sumitomo) discloses blends of polycarbonate with rubber modified copolymers obtained by polymerizing aromatic vinyl compounds, vinyl cyanides or unsaturated carboxylic acid alkyl esters in the presence of rubbers such as EPM or EPDM. A third component (epoxy group containing olefin copolymer) is required to give the desired improved weld strength in the final blend. EP-A-0119531 (General Electric Company) discloses blends of polycarbonate with polyolefins such as polypropylene and EPDM rubbers. However, there is no indication of the type of rubber which is required for the blends, and indeed a third component, an acrylic-olefin copolymer, is required to be used in conjunction with the olefin polymers or copolymers proposed in EP-A-0119531 to yield the improved impact strength sought by its authors.

However it has now surprisingly been found that polycarbonate can be modified to a tough product improved impact strength by use of a combination of components which seem to function in synergistic fashion to yield the property improvements which are desired. Thus according to one aspect of the present invention there is provided a thermoplastic polycarbonate composition of improved impact strength which comprises a polymer blend of:

(a) a thermoplastic polycarbonate plastics material; and (b) an impact modifier comprising (i) an elastomer component selected from ethylene-higher alpha olefin copolymers, ethylene-higher alpha olefinpolyene terpolymers and mixtures thereof, and (ii) an ethylene homo- or copolymer plastics component.

The amount of impact modifier component blended with the polycarbonate material can vary within wide ranges. However, in order to have sufficient modifier present to give a desired effect, the minimum amount is preferably 2 wt %, based on the weight of polycarbonate material (a) in the blend. The upper limit for the modifier content depends on the extent to which the basic polycarbonate properties are sought to be modified, which of course is dependent on the end use which is intended for the composition of the invention, and also to an extent, on the actual combination of components (i) and (ii) in the modifier itself. A practical upper limit has been found to be 30 wt %, based on the polycarbonate content being counted as 100%. Thus the preferred range of impact modifier content of the polymer blend is from 2-30 wt % based on the polycarbonate material, more preferably from 3-20 wt % and in particularly preferred embodiments, compositions containing from 4-10 wt % modifier, eg about 5 wt % modifier, based on the polycarbonate have been found to give overall properties which are an acceptable compromise between straight polycarbonate and straight elastoplastics characteristics. The lower concentrations do not give problems of incompatibility which may be encountered with higher modifier levels.

With regard to the nature of the impact modifier system itself, this preferably comprises a major proportion of the elastomer component, for example from 50 to 85 wt % of elastomer, based on the total weight of the modifier. More preferably the modifier comprises from 60-75 wt % elastomer, especially from 65-70 wt % thereof.

The elastomer may be an elastomeric copolymer of ethylene and another alpha olefin having three or more carbon atoms, preferably 3-8 carbon atoms and more preferably 3 carbons, than is EPM. Alternatively the elastomer may be, for example, such a copolymer having one or more additional comonomers such as a minor proportion of one or more polyenes such as the endomethylenes, 5-ethylidene norbornene (ENB), 5-methylene norbornene and dicyclopentadiene, or a non conjugated aliphatic diene such as 1,4 hexadiene.

The content of the additional comonomer in the terpolymer is typically 1-20 wt %, and the preferred comonomer is ENB. Methods for the preparation of such rubbery terpolymers are described, for example, in U.S. Pat. No. 2,933,480; U.S. Pat. No. 3,000,866 and U.S. Pat. No. 3,000,867.

These terpolymers, termed EPDM where the alpha-olefin comonomer is propylene, may be used alone or in admixture with other elastomers, preferably the above mentioned elastomeric ethylene copolymers, as the elastomeric component (i) of the compositions of the invention.

It has been found particularly useful to employ as elastomer component (i) of the modifier a highly amorphous EPM or EPDM polymer, the low crystallinity deriving from an ethylene content of from 45-55 wt %, preferably about 50 wt %. Such elastomers generally give good enhancement in the impact properties of the final composition. A further feature of elastomers which have proved particularly effective in compositions according to the invention is the molecular weight, which ideally is high, preferably in the Mw range from $200 \times 10^3$ to $450 \times 10^3$, more preferably from $300 \times 10^3$ to $400 \times 10^3$. This is reflected in a Mooney viscosity ML (1+8) at 127° C. of from 55-65, preferably about 60. Without wishing to be bound by theory it is believed that the effect of the high molecular weight elastomeric polymer is to give improved morphology control during the shaping processes associated with producing artefacts from the compositions of the invention (particle size growth during injection moulding is believed to lower the impact performance).

The effect of the modifier is a feature not only of the elastomer component (i) but also of the ethylene homo- or copolymer plastics component with which it is believed to cooperate in the blend in synergistic manner. Thus the second modifier component is preferably a homopolyethylene having a glass transition temperature (Tg) below −80° C. An example of such a polymer which has been found to combine excellently with the defined elastomer (i) as modifier for polycarbonate is high density polyethylene (HDPE) having specific gravity greater than 0.940. Preferably the HDPE has a molecular weight Mn in the range corresponding to MI (ASTM 1238 condition E ie 2.16 kg/190° C.) of 0.5-20, for example 0.5-8.0, more preferably 1-5 and especially 1.5-2.5. Typical Mn ranges for the HDPE are 5000-50000 with ranges such as 5000-15000 or 20000 to 30000 being preferred. The molecular weight distribution Mw/Mn is preferably in the range 2-15. The HDPE preferably has a Tg value of from −80° C. to −100° C.

The ethylene copolymer plastics which may be used as the plastics component of (i) include polyethylenes with typical comonomers such as butene, hexene, octene etc, introduced to control linearity and other properties of the plastics polymer.

It has been found that modifiers comprising a combination of EPM or EPDM, and HDPE, in a proportion of 65-70 EPM or EPDM: 35-30 HDPE, most preferably in a ratio of about ⅔ EPM or EPDM: about ⅓ HDPE, perform extremely well in modifying polycarbonate properties to give a much improved impact performance without the tradeoff in stiffness which is a feature of polycarbonate materials which have been modified with the usual modifiers such as PBT.

In accordance with the above, a particularly preferred embodiment of the invention comprises a polycarbonate plastics material and from 5-10 wt % (based on the polycarbonate) of a modifier comprising from 65-70 wt % of EPM or EPDM elastomer having 45-55 wt % ethylene and a Mooney viscosity ML (1+8) at 127° C. of 55-65 (i.e. highly amorphous, high molecular weight elastomer) and from 30-35 wt % of high density polyethylene of melt index (ASTM 1238 condition E) from 0.5 to 5.0, more preferably 1.5 to 2.5 eg about 2.0.

This combination of components (i) and (ii) behaves in an unexpected synergistic fashion to confer extremely useful properties on the modified polycarbonate. Thus as is mentioned hereinbefore, the amorphous ethylene/propylene rubber enhances impact properties, and its high molecular weight allows good morphology control during the shaping process by limiting particle size growth during injection moulding. The combination of HDPE with such EP rubber is believed to enable the HDPE to function as a viscosity modifier which therefore improves the dispersability of the EP rubber during mixing with the polycarbonate, by controlling the particle size of the dispersed phase. Preferably the modifier is dispersed uniformly throughout the continuous (polycarbonate) phase as particles in the size range 0.1–10 microns, more preferably 0.5–5 microns.

Without wishing to be bound by theory it is believed that the rubber forms a coating round the HDPE particles and hence has more effect on the polycarbonate phase since more of the rubber is apparently available to the polycarbonate to modify the same.

Furthermore, the combinations of EP rubber and HDPE as the modifier enables the modifier to be provided to the polycarbonate blending operation in the form of easily handled pellets.

The HDPE which is preferably employed has an extremely low glass transition temperature (Tg) for example below $-80°$ C., and therefore makes a contribution to the improvement in impact properties of the final blend at low temperatures such as $-40°$ C.

The use of the modifier system as defined can be supplemented in polycarbonate compositions as desired by the incorporation of any of a whole range of conventional additives which aid processing or confer other desirable properties on the final composition, e.g. antioxidants, colouring agents, fillers. In one embodiment it is preferred to incorporate into the composition a polyalkylene terephthalate material (PAT) such as polyethylene terephthalate (PET) and/or polybutene terephthalate (PBT).

When present, the PAT is preferably used in amounts of 2–100 wt % based on the weight of polycarbonate, more preferably 5–50 wt % and especially from 10–20 wt %. The PAT preferably has an intrinsic viscosity of 0.2–1.5 (in 60:40 phenol:tetrachloroethane at 30° C.), more preferably from 0.4 to 1.5 which corresponds approximately to a number average molecular weight of from 20000 to 50000. The presence of PAT serves to improve the Environmental Stress Cracking Resistance (ESCR) of the polycarbonate, but with the additional content of the defined impact modifier system, this does not result in the drop in impact performance which has been noted with PAT alone is used as the polycarbonate modifying system.

In general it has been found that the compositions of the invention, especially those which also contain PAT, are considerably toughened compared with polycarbonate alone, and are particularly useful for making moulded and extruded articles. Such articles have been found to possess, as a generality, greater ductility, lower toughness reduction when scratched or notched, and low sensitivity to the thickness of the article and better ESCR when compared with conventional polycarbonate fabricated materials.

The compositions of the invention may be produced by forming a molten preblend of the impact modifier components (i) and (ii), e.g. EPM and HDPE in the appropriate proportions; admixing the preblend and the polycarbonate material at elevated temperature, preferably from 220° C. to 280° C. and more preferably from 240° C. to 260° C. until a uniform dispersion is obtained; and then forming the mixture into a shaped body by, e.g. extrusion or moulding. The conventional processing aids and other additives such as PAT may be incorporated at any stage but preferably at the second stage where the polycarbonate and modifier preblend are combined. It is particularly preferred that the first step is performed by melting an already formed granulate of a blend of components (i) and (ii), thus enabling the invention to be developed by supply of such preblend in appropriate form to polycarbonate manufacturers or users for ready incorporation therein.

The rubber component of the modifier may be in cured or uncured form. It is believed that the incorporation of a curing agent for the rubber into the blending operation, when the final composition is intended for use in injection moulding, leads to certain improvements. Thus in the high shear conditions associated with injection moulding, the presence of a curative serves to "freeze" the rubber/polyethylene particles in the moulding and hence prevent particle coarsening. This dynamic curing technique therefore leads to an improved distribution of the polymer blend, hence improved impact performance, although the fact that the rubber is cured does not of itself have an effect on the properties of the final composition.

The invention is illustrated by the following examples.

EXAMPLES

A number of compounds were prepared having the overall compositions as shown in Table 1.

Preparation of compositions E and 1 was carried out by first forming a masterbatch of the components other than the plastics material in an internal mixer at 160° C. over a period of 5 minutes. This masterbatch ie the EPM/HDPE modifier or the polyisobutylene/HDPE blend was then incorporated into the plastics component in a Leistritz twin screw counterrotating extruder of screw diameter 45 mm and length/diameter ratio 22. The extruder was operated at 60 RPM with a temperature profile of 220° C.-230° C.-240° C.-250° C.-240° C. and an output of 12 to 23 kg/h. The other compositions were prepared by simply incorporating all of the components directly into the extruder and operating it at the conditions mentioned above.

The components used to produce the specified blends were as follows, using the designations of Table 1.

1. "PC" was LEXAN 141 polycarbonate supplied by General Electric Company, based on bisphenol A and having an intrinsic viscosity of 0.5 in methylchloride at 23° C.

2. "PBT" was ORGATER polybutene terephthalate supplied by Atochem.

3. "EPM" was VISTALON 808, an ethylene propylene copolymer rubber marketed by Exxon Chemical and having a Mooney viscosity ML (1+8) at 127° C. of 45 and 75 wt % ethylene content.

4. "MA-EPM" was VISTALON 808 which had been treated with maleic anhydride to form a grafted (reactive) material having 0.7 wt % maleic anhydride content.

5. "Blend" was 50/50 by weight mixture of HDPE having melt index 2 and specific gravity 0.950, and Vistaflex L-100, a polyisobutylene of Exxon Chemical Company having a viscosity average molecular weight according to the Standinger method of 80000–100000 and an intrinsic viscosity (in diisobutylene at 25° C.) of 2.5–3.2 dl/g.

6. "Modifier" was a preformed blend of 66 wt % VISTALON 606, a highly amorphous ethylene/propylene copolymer rubber of 50% ethylene content and high Mooney viscosity ML (1+8) 127° C.=60; and 34 wt % high density polyethylene of melt index 2 and specific gravity 0.950.

7. "PE" was low density polyethylene Escorene LDPE AG 100 of Exxon Chemical having melt index 2 and specific gravity 0.922.

The compositions produced as specified above were formed into standard test pieces by injection moulding under the following conditions:

Temperature profile of die: 270° C.-285° C.-285° C.-245° C.
Mould temperature: 80° C.
Injection pressure: 70 bars
Secondary pressure: 28 bars
Back pressure: 5 bars
Injection time: 2 seconds
Hold on timne: 25 seconds
Cooling time: 20 seconds The pieces were then tested for various characteristics by means of standard test procedures, as follows:

(1) Stress-strain testing: tensile strength (measured in units of MPa) and elongation at break (measured in %) were measured on dumbell samples in accordance with ASTM D638.

(2) Flexural modulus was measured in accordance with ASTM D790.

(3) HDT (heat distortion temperature) was measured in accordance with ASTM D648 at a pressure of 1.8 MPa, (4) Izod Impact test (notched) was measured in accordance with ASTM D 256.

Figure 2:
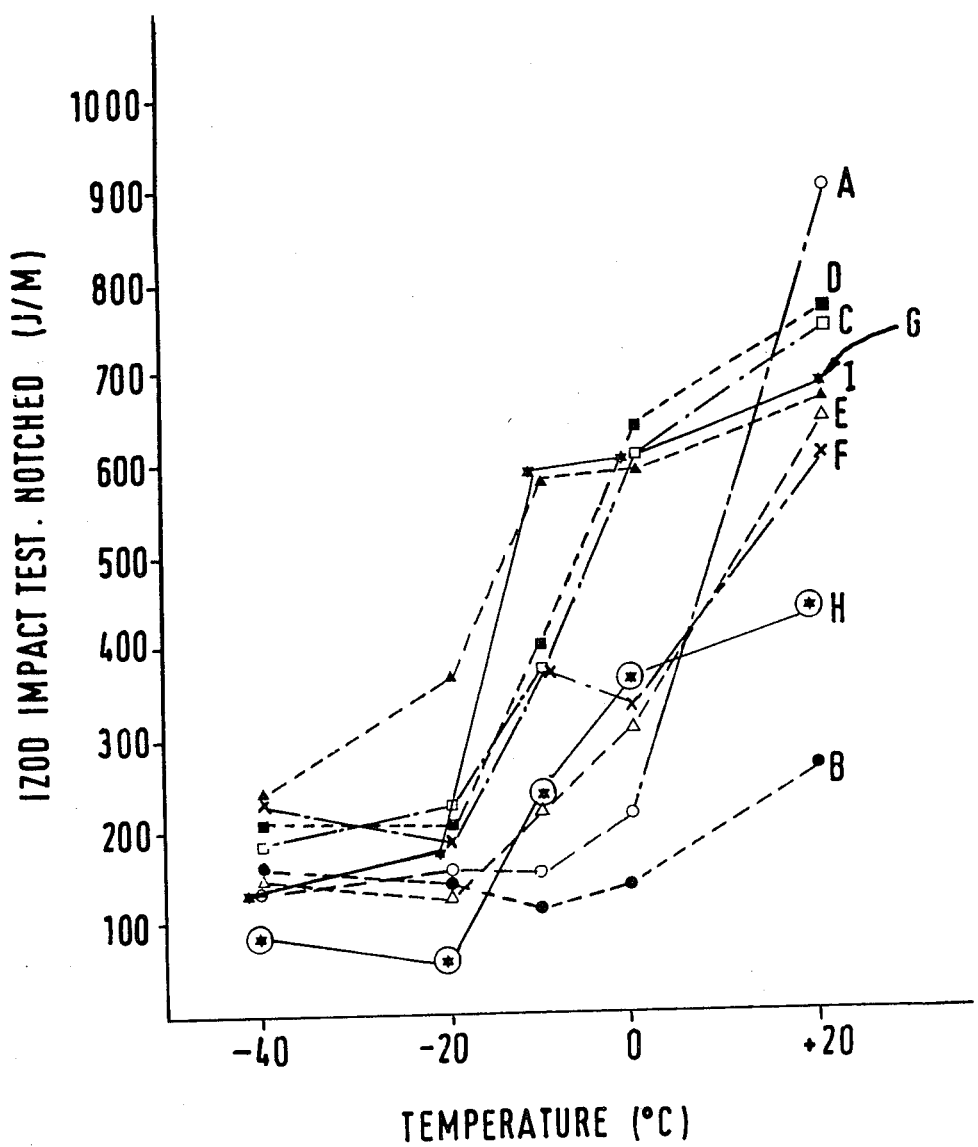

The results of the tests are shown in Table 2 and discussed hereinbelow with reference to the accompanying drawings, of which:

FIG. 1 is a plot showing the correlation between flexura modulus and Izod notched impact value at −10° C.; and FIG. 2 is a plot showing the variation of the Izod notched impact value for the compositions over a range of temperatures.

With regard to the Examples it may be concluded from FIG. 1 that the impact performance of straight PC (Composition A) is generally poor compared with that of Compositions C-H and 1, but that incorporation of PBT into the PC (Composition B) leads to a decrease in impact performance (although an improved ESCR, not shown). Looking at the value of Composition 1 according to the invention it is seen that this has an impact performance greatly increased over the values for all the comparison compositions except G (designated alphabetically). Thus at −10° C., the Izod notched impact strength of the PC/PBT/modifier blend is increased by about a factor of five compared with the PC/PBT blend not containing the EPM/HDPE modifier system. The incorporation of EPM (blend C) and PE (blend F) independently to mixtures of PC/PBT leads to an improvement in impact strength of these mixtures, but nowhere near as great as that derived from the use of the combination as modifier. Regarding compositions G and H, these have EPM blended in different proportions into straight PC, and so do not show the deleterious effect which is found with compositions also containing PBT. The behaviour of H is a reflection of the known fact that inclusion of modifiers into PC in high proportions may lead to compatibility problems.

Referring to FIG. 2, the behaviour of the compositions with regard to impact properties over a range of temperatures may readily be seen. Thus the impact strength of straight PC (Composition A) is seen to be considerably greater than PC/PBT (Composition B) at room temperature, but over the range −40° C. to 0° C. these compositions have very similar impact strengths. At room temperature the impact strengths of C-G and 1 are in about the same range, somewhat below the value for A but considerable above that for B. H, with a high amount of EPM in straight PC is midway between B and C-G in room temperature impact strength. With decreasing temperature the impact strength of all the compositions falls, but it is noticeable that the rate of fall is considerably lower for Composition 1 to a temperature of about −10° C. compared with most of the other compositions, and in absolute terms over the range −40° C. to 0° C., Composition 1 of the invention has impact strengths greater than, and at −30° C., −20° C. and −10° C. surprisingly greater than the other compositions which also contain PBT. In particular, at −10° C. the Izod notched impact strength of the PC/PBT/Modifier (EPM+HDPE) composition is some five times as great as for PC alone or the PC/PBT composition. the advantages of such an increase in impact strength are clear, especially when coupled with the improved ESCR brought by incorporating PBT into the blend. It is noted that down to −10° C. the EPM/PC blend G matches composition 1 (although of course G will not have the good ESCR properties of 1 since it does not contain PBT). However below −10° C. to temperatures approaching −40° C. the impact strength of composition 1 according to the invention is surprisingly high compared with all the other compositions.

With reference to Table 2 in general, it may be concluded that the composition of the invention provides an excellent impact performance improvement on PC/PBT blends without the trade off in stiffness which occurs when conventional impact modifier systems are employed. Thus for Composition 1 (and referring also to FIG. 2) the ductile-brittle transition temperature of Composition 1 is lowered to about −20° C. or −25° C. compared with the approximately +10° C. value for pure PC (Composition A) and an estimated +40° C. value for the PC/PBT blend designated B. The PC/PBT/PE Composition F would seem to become brittle at about 0° C. to −5° C. It will be acknowledged that this increased ductility of Composition 1 enlarges considerably the serviceability temperature range of the composition. It is foreseen that this will reduce the sensitivity of the thus modified polycarbonate to sample thickness effects, a major drawback with polycarbonate routinely modified with PBT.

A further conclusion to be drawn from Table 2 is that incorporation of an elastomer component (alone) or a polyethylene component (alone) into PC/PBT or straight PC does not produce the same improvement in impact performance as incorporation of the defined combination. In addition, the effect of the elastomer alone is not seen to vary greatly in dependence on whether the rubber is modified with a grafting agent such as maleic anhydride or is ungrafted.

TABLE 1

| Composition | A | B | C | D | E | 1 | F | G | H |
|---|---|---|---|---|---|---|---|---|---|
| PC | 100 | 90 | 85 | 85 | 85 | 85 | 95 | 95 | 85 |
| PBT | — | 10 | 10 | 10 | 10 | 10 | 10 | — | — |
| EPM | — | — | 5 | — | — | — | — | 5 | 15 |
| MA-EPM | — | — | — | 5 | — | — | — | — | — |
| Blend | — | — | — | — | 5 | — | — | — | — |
| Modifier | — | — | — | — | — | 5 | — | — | — |
| PE | — | — | — | — | — | — | 5 | — | — |

TABLE 2

| Composition | A | B | C | D | E | 1 | F | G | H |
|---|---|---|---|---|---|---|---|---|---|
| Tensile Strength MPa | | | | | | | | | |
| Yield | 65 | 71 | 62 | 62 | 62 | 61 | 62 | 56 | 43 |
| At Break | 66 | 55 | 52 | 56 | 49 | 51 | 51 | 48 | 47 |
| Minimum | 53 | 54 | 48 | 51 | 49 | 48 | 50 | — | — |
| Elongation at Break,% | 71 | 76 | 90 | 100 | 18 | 92 | 51 | 117 | 172 |
| Flexural Modulus, MPa | 2040 | 2230 | 2000 | 1965 | 2070 | 2060 | 2058 | 1940 | 1478 |
| HDT (1.8 MPa), °C. | 128 | 109 | 106 | 106 | 105 | 106 | 106 | 123 | 122 |
| IZOD Impact Test (notched), J/m | | | | | | | | | |
| +23° C. | 909 | 271B | 755 | 773 | 656 | 668 | 619 | 670 | 465 |
| 0° C. | 218B | 143B | 614 | 647 | 318B | 612 | 323B | 608 | 373 |
| −10° C. | 150B | 116B | 372B | 400 | 220B | 586 | 365B | 589 | 242B |
| −20° C. | 158B | 138B | 224B | 202B | 135B | 369B | 199B | 191B | 58B |
| −40° C. | 135B | 169B | 184B | 213B | 153B | 242B | 272B | 133B | 91B |

I claim:

1. A thermoplastic polycarbonate composition of improved impact strength which comprises a polymer blend of:
    (a) a thermoplastic polycarbonate plastics material; and
    (b) an impact modifier comprising (i) an elastomer component which contains from 45–55 wt.% ethylene selected from highly amorphous ethylene-higher alpha olefin copolymers, highly amorphous ethylene-higher alpha olefin-polyene terpolymers and mixtures thereof, and (ii) a plastics component selected from ethylene homo- and copolymers.

2. A composition according to claim 1 which comprises from 2–30 wt % impact modifier (b) based on the weight of polycarbonate material (a).

3. A composition according to claim 2 which comprises from 3–20 wt % (b).

4. A composition according to claim 1 wherein the modifier (b) comprises from 50∝85 wt % elastomer component (i), based on the total weight of (b).

5. A composition according to claim 4 wherein the modifier (b) comprises from 60–75 wt % (i).

6. A composition according to claim 1 wherein said elastomer component (i) has a Mooney ML (1+8) at 127° C. of 55–65 (ASTM D1646).

7. A composition according to claim 1 wherein the elastomer component (i) comprises EPM copolymer, EPDM terpolymer or a mixture thereof, the terms EPM and EPDM being used herein in accordance with their ASTM designations.

8. A composition according to claim 1 wherein component (ii) of modifier (b) comprises a homopolyethylene having a Tg value below −80° C.

9. A composition according to claim 8 wherein component (ii) comprises high density polyethylene of melt index from 1.5 to 2.5.

10. A composition according to claim 1 which comprises, in addition to the polymer blend, a polyalkyleneterephthalate material.

11. A composition according to claim 10 wherein the said polyalkyleneterephthalate material is selected from polyethyleneterephthalate, polybuteneterephthalate and mixtures thereof.

12. A composition according to claim 10 which comprises from 2–100 wt % said polyalkyleneterephthalate material, based on the weight of polycarbonate.

13. A composition according to claim 10 which comprises from 5–50 wt % said polyalkyleneterephthalate material.

14. A thermoplastic polycarbonate composition of improved impact strength which comprises a polymer blend of:
    (a) a thermoplastic polycarbonate plastics material; and
    (b) an effective amount of an impact modifier comprising (i) an elastomer component selected from high viscosity, highly amorphous EPM copolymers and EPDM terpolymers containing from 45–55 wt % ethylene and having a Mooney ML (1+8) at 127° C. of from 55–65 (ASTM D 1646), and (ii) a high density polyethylene of melt index from 0.5 to 5.0 (ASTM 1238 Condition E) and Tg value below −80° C.

15. A method of producing a composition according to claim 1 which comprises (I) forming a molten preblend of modifier components (i) and (ii); (II) admixing component (a) with said preblended modifier, optionally together with process aids and conventional additives for thermoplastic materials, at a temperature in the range 220° to 280° C.; and (III) forming the resulting admixture into a shaped body.

16. A method according to claim 15 wherein step (I) is performed by melting an already formed granulate of a blend of said components (i) and (ii).

* * * * *